US011667061B2

(12) United States Patent
Tsai et al.

(10) Patent No.: US 11,667,061 B2
(45) Date of Patent: Jun. 6, 2023

(54) METHOD OF FORMING LEVERAGED POROMERIC POLISHING PAD

(71) Applicant: Rohm and Haas Electronic Materials CMP Holdings, Inc., Newark, DE (US)

(72) Inventors: Wei-Wen Tsai, Philadelphia, PA (US); Katsumasa Kawabata, Kyoto (JP); Hui Bin Huang, Monroeville, NJ (US); Akane Uehara, Kyoto (JP); Yosuke Takei, Shimane (JP)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 642 days.

(21) Appl. No.: 16/852,420

(22) Filed: Apr. 18, 2020

(65) Prior Publication Data
US 2021/0323202 A1    Oct. 21, 2021

(51) Int. Cl.
*B29C 39/18* (2006.01)
*B29C 43/30* (2006.01)
*B24B 37/24* (2012.01)
*C08J 5/18* (2006.01)
*B29C 43/00* (2006.01)
*B29C 39/14* (2006.01)
*B29L 31/00* (2006.01)
*B29K 75/00* (2006.01)

(52) U.S. Cl.
CPC .............. *B29C 39/18* (2013.01); *B24B 37/24* (2013.01); *B29C 39/14* (2013.01); *B29C 43/003* (2013.01); *B29C 43/305* (2013.01); *C08J 5/18* (2013.01); *B29K 2075/00* (2013.01); *B29L 2031/736* (2013.01); *C08J 2375/04* (2013.01)

(58) Field of Classification Search
CPC ................................ B29C 39/14; B29C 39/18
See application file for complete search history.

(56) References Cited

U.S. PATENT DOCUMENTS

| 4,537,817 A * | 8/1985 | Guillaume ............. D06N 3/125 |
| | | 427/176 |
| 4,841,680 A * | 6/1989 | Hoffstein ................ B24B 37/24 |
| | | 15/244.4 |
| 6,899,602 B2 * | 5/2005 | Fawcett .................. B24B 37/24 |
| | | 451/41 |

(Continued)

FOREIGN PATENT DOCUMENTS

JP  05917236  5/2016
JP  05969846  8/2016

(Continued)

OTHER PUBLICATIONS

Copending U.S. Appl. No. 16/852,418.
Copending U.S. Appl. No. 16/852,422.

*Primary Examiner* — Timothy Kennedy
(74) *Attorney, Agent, or Firm* — Blake T. Biederman (57) ABSTRACT

The invention provides a method of forming porous polyurethane polishing pad that includes feeding liquid polyurethane onto a web sheet with a doctor blade while back tensioning the web. Coagulating liquid polyurethane onto the web sheet forms a two-layer substrate. The two-layer substrate has a porous matrix wherein the porous matrix has large pores extending upward from a base surface and open to an upper surface. Spring-arm sections connect lower and upper sections of the large pores.

10 Claims, 6 Drawing Sheets

(56) References Cited

U.S. PATENT DOCUMENTS

| | | | | |
|---|---|---|---|---|
| 7,300,335 | B2* | 11/2007 | Tajima | B24B 37/08 451/41 |
| 7,897,250 | B2* | 3/2011 | Iwase | B24B 37/26 428/315.7 |
| 7,976,901 | B2* | 7/2011 | Kume | B24D 3/32 427/341 |
| 8,765,259 | B2* | 7/2014 | Feng | C08J 5/128 428/343 |
| 9,925,637 | B2* | 3/2018 | Yoshida | B24B 37/26 |
| 10,071,460 | B2* | 9/2018 | Tateno | C08L 75/06 |
| 10,106,662 | B2 | 10/2018 | Luo et al. | |
| 10,259,099 | B2* | 4/2019 | Yoshida | B24D 18/0009 |
| 2006/0202384 | A1* | 9/2006 | Duong | B29C 39/18 524/502 |
| 2007/0141312 | A1* | 6/2007 | James | B24B 37/22 428/212 |
| 2013/0140744 | A1* | 6/2013 | Nakai | B32B 38/06 264/447 |
| 2015/0038066 | A1* | 2/2015 | Huang | B24B 37/205 451/529 |
| 2019/0091917 | A1* | 3/2019 | Christiano | B29C 48/914 |

FOREIGN PATENT DOCUMENTS

| | | |
|---|---|---|
| JP | 06494375 | 4/2019 |
| JP | 06587464 | 10/2019 |
| WO | 2015037606 | 3/2015 |

\* cited by examiner

METHOD OF FORMING LEVERAGED POROMERIC POLISHING PAD

BACKGROUND

The present invention relates to chemical mechanical polishing pads and methods of forming the polishing pads. More particularly, the present invention relates to poromeric chemical mechanical polishing pads and methods of forming poromeric polishing pads.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes non-planar. Because subsequent semiconductor processing (e.g., photolithography) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish work pieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

The CMP process usually occurs on a single polishing tool in two or three steps. The first step planarizes the wafer and removes the bulk of the excess material. After the planarization, the subsequent step or steps remove scratches or chattermarks introduced during the planarization step. The polishing pads used for these applications must be soft and conformal to polish the substrate without scratching. Furthermore, these polishing pads and slurries for these steps often require selective removal of material, such as a high TEOS to metal removal rate. For purposes of this specification, TEOS is the decomposition product of tetra-ethyloxysilicate. Since TEOS is a harder material than metals such as copper, this is a difficult problem that manufacturers have been addressing for years.

Over the last several years, semiconductor manufacturers have been moving increasingly to poromeric polishing pads, such as Politex™ and Optivision™ polyurethane pads for finishing or final polishing operations in which low defectivity is a more important requirement (Politex and Optivision are trademarks of DuPont de Nemours, Inc. or one or more of its affiliates). For purposes of this specification the term poromeric refers to porous polyurethane polishing pads produced by coagulation from aqueous solutions, non-aqueous solutions or a combination of aqueous and non-aqueous solutions. The advantage of these polishing pads is that they provide efficient removal with low defectivity. This decrease in defectivity can result in a dramatic wafer yield increase.

A polishing application of particular importance is copper-barrier polishing in which low defectivity is required in combination with the ability to remove both copper and TEOS dielectric simultaneously, such that the TEOS removal rate is higher than the copper removal rate to satisfy advanced wafer integration designs. Commercial pads such as Politex polishing pads do not deliver sufficiently low defectivity for future designs nor is the TEOS:Cu selectivity ratio high enough. Other commercial pads contain surfactants that leach during polishing to produce excessive amounts of foam that disrupts polishing. Furthermore, the surfactants may contain alkali metals that can poison the dielectric and reduce the semiconductor's functional performance.

Despite the low TEOS removal rate associated with poromeric polishing pads, some advanced polishing applications are moving toward all-poromeric pad CMP polishing operations because of the potential of achieving lower defectivity with poromeric pads versus other pad types such as IC1000™ polishing pads. Although these operations provide low defects, the challenges remain to further decrease pad-induced defects and to increase polishing rate.

STATEMENT OF INVENTION

An aspect of the invention provides a method of forming a porous polyurethane polishing pad comprising: feeding liquid polyurethane onto a web sheet with a doctor blade while back tensioning the web with compression into the web sheet to prevent the liquid polyurethane from leaking opposite of a web direction; coagulating liquid polyurethane onto the web sheet to form a two-layer substrate, the two-layer substrate being a porous body on the web sheet, the porous body having a porous matrix, wherein the porous matrix has large pores extending upward from a base surface and open to an upper surface, the large pores being interconnected with tertiary pores, a portion of the large pores being open to a top polishing surface; pulling the two layer substrate over a touch roll to compress the porous body and pull the porous body forming to deform the porous matrix in a shear zone, after passing the shear zone, at least a portion of the large pores extending to the top polishing surface have a lower and upper sections with a vertical orientation, vertical direction being a direction orthogonal to the web sheet and spring-arm sections connecting the lower and upper sections, the spring-arm sections all being in the web direction and having an angle from an upward vertical between 15 and 90 degrees wherein the spring-arm sections combine to increase compressibility and contact area of the polishing pad; curing the two layer substrate to cure the porous body and lock the porous body with the spring-arm-sections connecting the lower and upper sections; and forming the cured porous body into the polishing pad, the polishing pad containing the spring-arm-sections connecting the lower and upper sections.

Another aspect of the invention provides a method of forming a porous polyurethane polishing pad comprising: feeding liquid polyurethane onto a web sheet with a doctor blade while back tensioning the web with compression into the web sheet to prevent the liquid polyurethane from leaking opposite of a web direction; coagulating liquid polyurethane onto the web sheet to form a two-layer substrate, the two-layer substrate being a porous body on the web sheet, the porous body having a porous matrix, wherein the porous matrix has large pores extending upward from a base surface and open to an upper surface, the large pores being interconnected with tertiary pores, a portion of the large pores being open to a top polishing surface; pulling the two layer substrate over a touch roll to compress the porous body and pull the porous body forming to deform the porous matrix in a shear zone, after passing the shear zone, at least a portion of the large pores extending to the top polishing surface have a lower and upper sections with a vertical orientation, vertical direction being a direction orthogonal to the web sheet and spring-arm sections connecting the lower and upper sections, the spring-arm sections all being in the web direction and having an angle from an upward vertical between 15 and 90 degrees wherein the spring-arm sections combine to increase compressibility and contact area of the polishing pad; forming middle-sized pores having a vertical orientation adjacent the spring-arm sections of the large pores and small pores between the middle-sized pores; curing the two layer substrate to cure the porous body and lock the porous body with the spring-arm-sections connecting the lower and upper sections; and forming the cured porous body into the polishing pad, the polishing pad containing the spring-arm-sections connecting the lower and upper sections.

DETAILED DESCRIPTION

The polishing pad of the invention is useful for polishing at least one of magnetic, optical and semiconductor substrates. In particular, the polyurethane pad is useful for polishing semiconductor wafers; and in particular, the pad is useful for polishing advanced applications such as copper-barrier applications in which very low defectivity is more important than the ability to planarize and in which it is necessary to remove multiple materials simultaneously such as copper, barrier metals and dielectric materials, including but not limited to TEOS, low k and ultra-low k dielectrics. For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof.

The porous polyurethane polishing pad includes a porous matrix having large pores that extend upward from a base surface and open to an upper surface or polishing surface. The large pores interconnect with tertiary pores. Although it is possible for all pores to open at the top surface, typically only a portion of the large pores open to a top polishing surface. At least a portion of the large pores extend to the top polishing surface have lower and upper sections with vertical orientations. For purposes of this specification, vertical refers to a direction orthogonal to the base surface toward the upper surface. Typically, the average diameter of the large pore's lower section is greater than average diameter of the large pore's upper section.

Spring-arm sections connect the lower and upper sections. The spring-arm sections all extend in the same horizontal direction as measured from the vertical orientation. Although it is possible to bend the spring arms in multiple directions, typically pulling a web in shear creates spring-arm sections that all extend in the same direction. As a result, the middle or spring-arm section typically has an average diameter less than an average diameter of the lower section of the large pore. For long middle or spring-arm sections, they typically have an average diameter less than an average diameter of the lower section and an average diameter of the upper section of the large pore.

These spring-arm sections combine for increasing compressibility of the polishing pad and contact area of the top polishing surface during polishing. Advantageously, the spring-arm sections create a horizontal overlap between a majority of the lower and upper sections of the large pores. This shift in the large pores facilitates compression of the entire polishing pad. Most advantageously, the spring-arm sections create a horizontal separation gap between a majority of the lower and upper sections of the large pores. Because the longer the spring-arm, the greater the leverage effect and the greater the compressibility of the polishing pad. Increasing compressibility is useful for conformance of the polishing pad on the wafer and increased contact area for higher polishing rates. Advantageously, the spring-arm sections have an angle between 15 and 90 degrees as measured from an upward vertical direction.

In addition to the large pores, middle-sized pores initiate adjacent spring-arm sections of the large pores and the middle-sized pores have a vertical orientation. Middle-sized pores typically initiate at adjacent locations horizontal to and above the spring-arm section. Similarly, small pores initiate between and interconnect the middle-sized pores. As suggested, the large pores are the largest and typically have a vertical height of about twice the vertical height of the middle-sized pores. The large pores with spring-arm or connection sections advantageously represent less than fifty percent of a total of large pore plus middle-sized pores and small pores. The large, middle-sized and small pores all combine to increase the compressibility of the polishing pads.

The polishing pad advantageously has a compressibility measured with a uniaxial compression tester having a Keyence laser thickness measuring gage configured as follows:

TABLE 1

|  | Probe Diameter (mm) | Probe Area (cm²) | Weight 1 (g) | Weight 2 (g) | Total (g) | Load Cell (g) | Loss (g) | Downforce (g/cm²) |
| --- | --- | --- | --- | --- | --- | --- | --- | --- |
| Thickness 1 (T1) | 5 | 0.19625 | 60.5 |  | 60.5 | 56.5 | 4 | 288 |
| Thickness 2 (T2) | 5 | 0.19625 | 60.5 | 98 | 158.5 | 153.5 | 5 | 782 |

Deflection=$T1-T2$

Compressibility(%)=$(T1-T2)/T1$

The deflection tool operates by first adding weight 1 to a rod that presses a 5 mm diameter solid metal probe against a flat sample and measuring the thickness (T1) after sixty seconds. Then after waiting an additional sixty seconds, increasing weight by adding the second weight to the rod presses the probe farther into the sample. Then measurement after an additional sixty seconds represents the final thickness (T2) used to calculate compressibility with the above formula. For purposes of this application and specifically the examples, all compressibility data and ranges represent values measured with the above test method.

The polishing pad advantageously has a compressibility of at least 5% with the above test. Most advantageously, the polishing pad has a compressibility of 5 to 10% with the above test.

Advantageously, the polishing pad has an embossed surface forming grooves that extend to a perimeter of the polishing pad. Typically, the embossing is in an X-Y square grid pattern. But the embossing may be in any known pattern, such as circular or circular plus radial.

Figure 1:
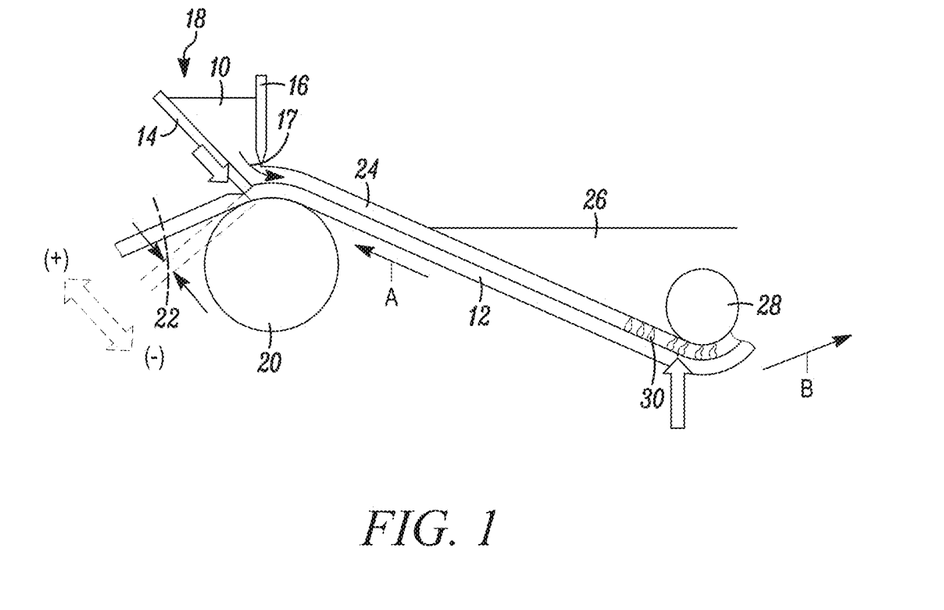
FIG. 1 is a schematic of a coagulation line use used to fabricate polyurethane polymer rolls.

Referring to FIG. 1, polyurethane-water-dimethylformamide ("DMF") coating mixture 10 coats felt roll 12 by controlling back blade 14 and knife or doctor blade 16. The porous polishing layer is either fixed to a polymeric film substrate or formed onto a woven or non-woven structure to form the polishing pad. When depositing the porous polishing layer onto a polymeric substrate, such as a non-porous poly (ethyleneterephthalate) film or sheet, it is often advantageous to use a binder, such as a proprietary urethane or acrylic adhesive to increase adhesion to the film or sheet. Although these films or sheets may contain porosity, advantageously these films or sheets are non-porous. The advantage of non-porous films or sheets is that they promote uniform thickness or flatness, increase the overall stiffness and decrease the overall compressibility of the polishing pad, and eliminate slurry wicking effects during polishing.

Together, felt roll 12, back blade 14 and doctor blade 16 with side walls (not seen) form a trough 18 that holds the coating mixture 10. Back blade 14 presses felt roll 12 against backup roll 20 to prevent the coating mixture 10 from flowing out the rear portion of the trough 18. Backup roll 20 rotates clockwise during operation of the coating line.

Moving the back blade 14 toward or away from the backup roll 20 determines the width of gap 22. The smaller the gap 22, the greater the back tension on felt roll 12. Dotted arrow 22A illustrates the change in width of gap 22 achieved by moving back blade 14 either toward backup roll 20 for a decreased (−) gap and increased tension or away from backup roll 20 for and increased gap (+) and decreased tension. Tension vector A indicates the direction of the back tension on felt roll 12. The height of doctor blade 16 determines the thickness of coating 24 on felt roll 12. Since the doctor blade 16 controls the thickness of the liquid coating mixture 10, it provides near-zero or no back tension of the felt roll 12.

Tension rollers not seen, pull felt roll 12 with coating 24 into water bath 26. Tension vector B indicates the direction of the tension pulling both the felt roll 12 and the coating 24 through the water bath 26. Immediately upon immersion into the water bath 26, DMF diffuses out of the coating mixture 10 and becomes replaced with water having a lower concentration of DMF. This rapid diffusion creates pores in the coating 24. Moving touch roll 28 up and down facilitates adjustment of the tension and compression on the felt roll 12 having coating 24. Because coating mixture 10 is a liquid-solid mixture, there is no back tension on the coating 24 between the doctor blade 16 and the touch roll 28. There is only tension of coating 24 after it travels past touch roll 28. Touch roll 28 rotates counterclockwise during operation of the coating line. As large pores 30 travel and engage with touch roll 28, the tension and compression forces combine to deform the pores 30. Increasing the line speed provides less time for the matrix surrounding the pores to setup and harden. The matrix must have sufficient strength to hold shape, but insufficient strength to elastically deform and recover. This partial hardening before curing in an oven facilitates formation of the deformed pores 30.

Figure 2:
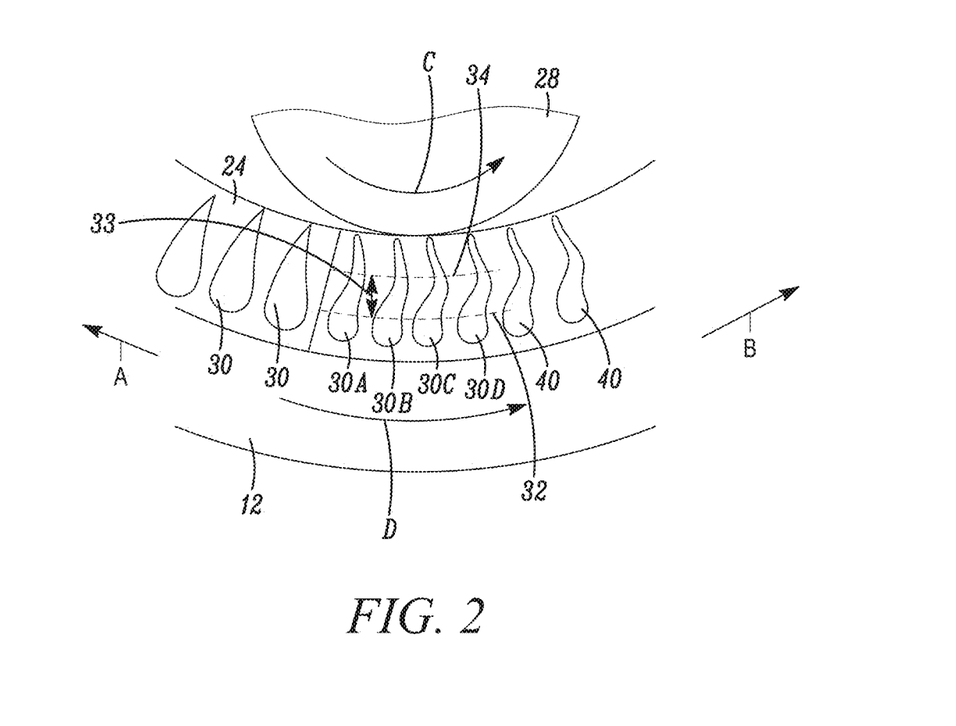
FIG. 2 is a schematic of a touch roll used to create a shear zone in the polyurethane polymer rolls.

Referring to FIG. 2, the combination of back tension on felt roll 12 and pull tension on felt roll 12 and coating 24 post-touch roll 28 combine to create a shear zone 33 illustrated by dashed lines for lower shear zone boundary 32 and upper shear zone boundary 34. Arrow C provides the rotation direction of touch roll 28. In the shear zone 33, between dotted lines 32 and 34, large pores 30 transform from vertical pores to large vertical pores 40 having a jog of spring-arm section 42 (FIG. 3A). Arrow D provides the direction of felt roll 12 at touch roll 28. At touch roll 28, tension vectors A and B pull in opposite directions through lower shear zone boundary 32 up to upper shear zone boundary 34 or the upper end of the shear zone 33. The shear zone 33 defined between lower and upper boundaries, 32 and 34, progressively deforms large pores 30. Pore 30A illustrates an initial bend in a mid-section. Pore 30B has a more defined bend in its mid-section. Pore 30C has a well-defined bend with modest narrowing of its mid-section. Pore 30D has a near-final bend with near-final narrowing of its mid-section. Pores 40 represent final large pores that contain spring-arm sections. These spring-arm sections facilitate high compressibility and conformability for the final polishing pads.

Figure 3:
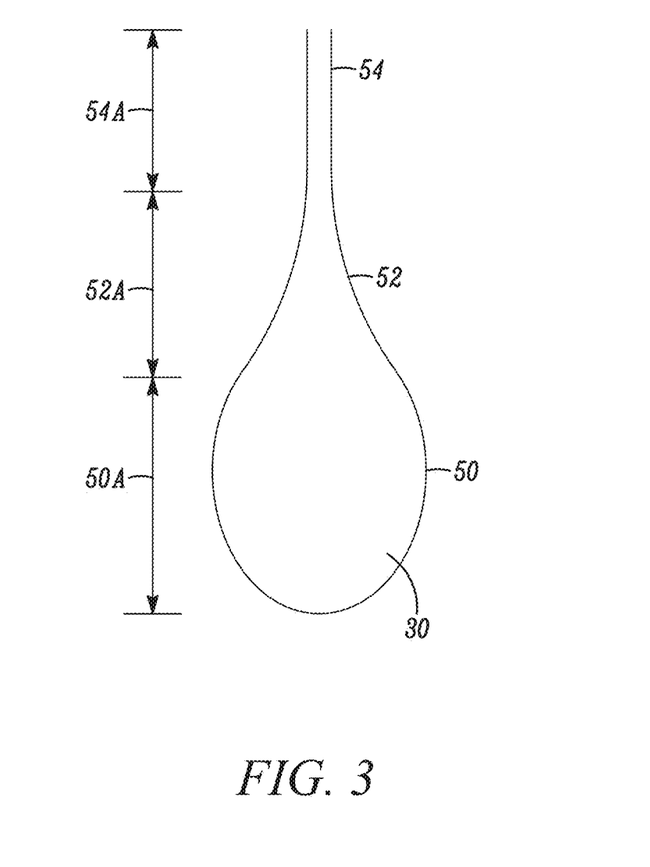
FIG. 3 is a schematic of a large pore illustrating the main section, middle section and lower section before deformation at the touch roll.
Figure 3A:
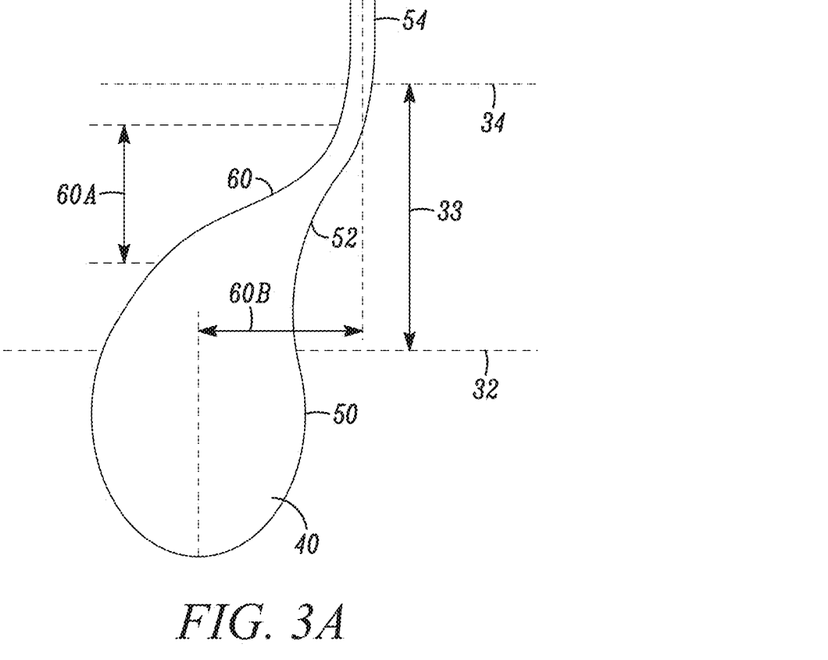
FIG. 3A is a schematic of a large pore illustrating the spring-arm section after deformation at the touch roll having a horizontal separation gap between an upper and lower section of the large pore.
Figure 3B:
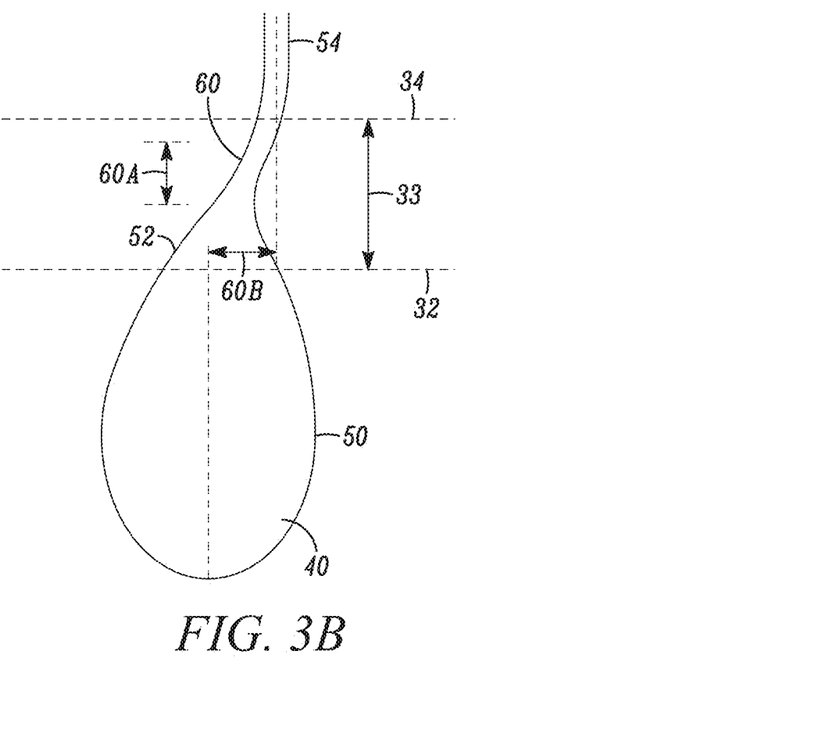
FIG. 3B is a schematic of a large pore illustrating the spring-arm section after deformation at the touch roll having a horizontal overlap between an upper and lower section of the large pore.

Referring to FIGS. 3, 3A and 3B, large pore 30 includes main section 50 having a tear drop shape, middle section 52 having a tapered neck shape and upper section 54 having a vertical orientation and a slight taper. Arrow sections, 50A, 52A and 54A define the heights of main section 50, middle section 52 and upper section 54, respectively. Typically, the shear zones boundaries 32 and 34 extend from an upper portion of the main section 50 through the middle section 52 to a lower portion of upper section 54. During deformation, upper portion of main section 50 deforms in the pulling direction. Middle section 52 deforms in multiple directions and aspects. The pore elongates and narrows to first bend from a vertical direction to a partial horizontal-partial vertical direction and then bend upward from the partial horizontal-partial vertical direction back to a vertical direction. As the pore elongates and narrows, it produces a decreased cross-section or average diameter. This narrow region that extends at least partially in a horizontal direction is known as the spring-arm section 60. Arrows 60A define the height and length of the spring-arm section 60. Arrows 60B extend from the vertical bisect of main section 50 to the vertical bisect of upper section 54 to define the offset of the upper section. Advantageously, the spring-arm sections 60 have an angle from vertical between 15 and 90 degrees. Most advantageously, the spring-arm sections 60 have an angle from vertical between 25 and 80 degrees.

Referring to FIG. 3A, when the shear zone 33 is large, then the upper section 54 shifts in a horizontal direction a sufficient distance to create a horizontal gap 60B for spring-arm section 60 that extends beyond lower section 50 of large pore 40. Referring to FIG. 3B, when the shear zone 33 is small, then the upper section 54 shifts in a horizontal direction an insufficient distance to create a horizontal gap 60B for spring-arm section 60 that extends beyond lower section 50 of large pore 40. In this case, there is horizontal overlap between the upper section of the spring-arm section 60 and the outermost portion of lower section 50 of large pore 40. The force in shear zone 33 in combination with the yield strength of the polymer matrix control the ultimate length of the spring-arm section 60.

Figure 4:
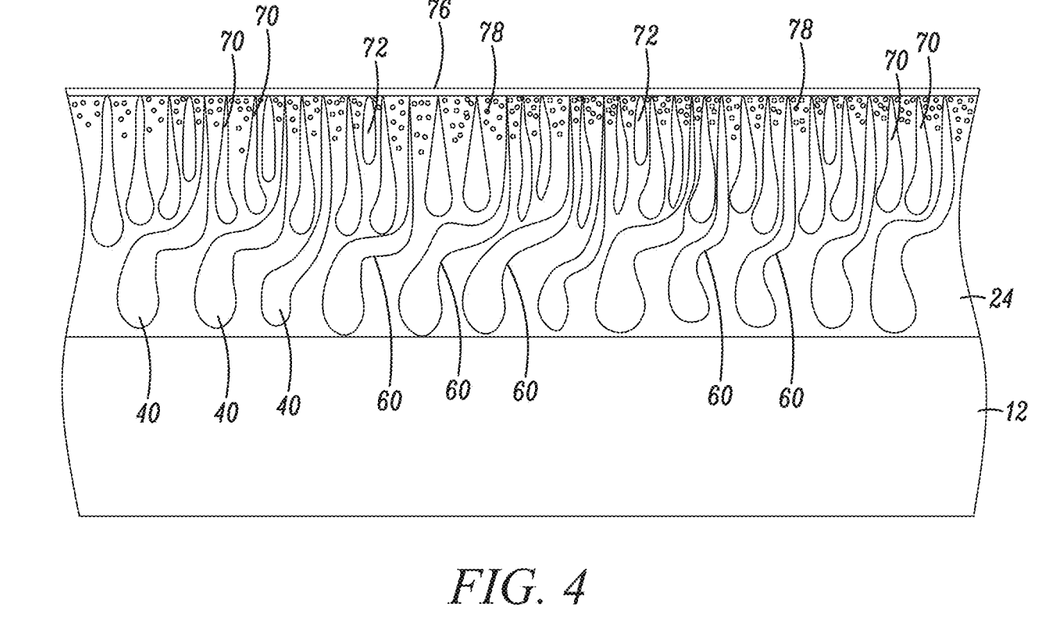
FIG. 4 is a schematic of a plurality large pore illustrating the spring-arm sections with secondary large pores located adjacent the spring-arm sections.
Figure 4A:
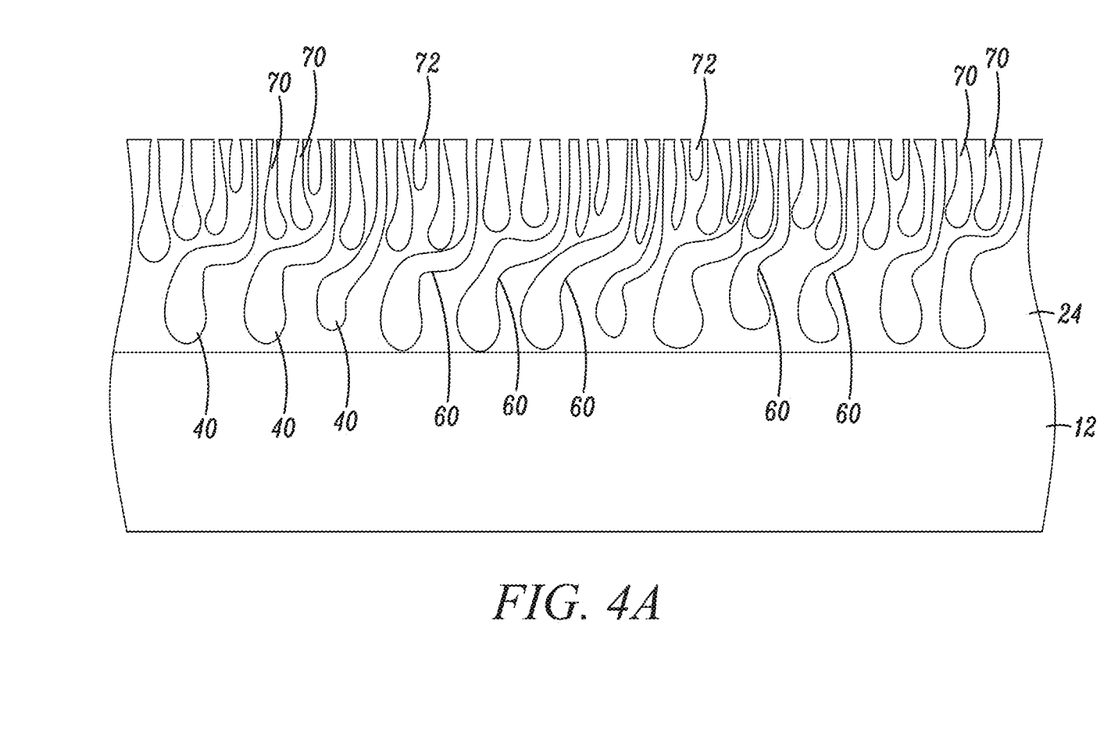
FIG. 4A is a schematic of FIG. 4 post-buffing to further open the large pores, secondary pores and upper secondary pores.

Referring to FIG. 4, coated felt substrate 12 includes a plurality of large pores 40 containing spring-arm sections 60. The plurality of spring-arm sections combine to increase compressibility and contact area during polishing. A series of large secondary pores 70 initiate from locations adjacent the spring-arm sections 60. Similarly, a set of upper secondary pores 72 initiate at a location about halfway up the secondary pores 70. Typically, large pores 60 have the largest size. Secondary pores 70 tend to be smaller than large pores 40, but larger than upper secondary pores 72. Large pores 40, secondary pores 70 and upper secondary pores 72 all extend through to skin layer 76 at the top surface. Fine pores 78 are prevalent in the subsurface just below the skin layer 76.

After DMF removal, oven drying cures the thermoplastic polyurethane. Optionally, a high-pressure wash and drying step further cleans the substrate. After drying and referring to FIG. 4B, a buffing step removes skin layer 76 and fine pores 78 to open the large pores 40, secondary pores 70 and upper secondary pores 72 to a controlled depth. This enables consistent pore counts and open pore area on the top surface. During buffing, it is advantageous to use a stable abrasive that does not dislodge and work its way into the porous substrate. Typically diamond abrasives produce the most consistent texture and are least prone to breaking off during buffing. After buffing, the substrate has a typical nap height of 10 to 30 mils (0.25 to 0.76 mm) and a total thickness of 30 to 60 mils (0.76 to 1.52 mm). Average large pore diameter can range from 5 to 85 µm. Typical density values are 0.2 to 0.5 g/cm$^3$. The cross-sectional pore area is typically 10 to 30 percent with a surface roughness Ra of less than 14 and Rp of less than 40. The polishing pad's hardness is preferably 40 to 74 Asker C.

In an alternative embodiment, non-porous films serve as the base substrate. The most notable disadvantage of films is air bubbles that can be trapped between the polishing pad and the platen of the polishing tool when non-porous films or porous substrates in combination with adhesive films are used as the base substrate. These air bubbles distort the polishing pad to create defects during polishing. Patterned release liners facilitate air removal to eliminate air bubbles under these circumstances. This results in major issues with polishing non-uniformity, higher defectivity, high pad wear and reduced pad life. These problems are eliminated when felt is used as the base substrate since air can permeate through the felt and air bubbles are not trapped. Secondly, when the polishing layer is applied to film the adhesion of the polishing layer to the film depends on the strength of the adhesive bond. Under some aggressive polishing conditions, this bond can fail and result in catastrophic failure. When felt is used the polishing layer actually penetrates a certain depth into the felt and forms a strong, mechanically interlocked interface. Although woven structures are acceptable, non-woven structures can provide additional surface area for strong bonding to the porous polymer substrate. An excellent example of a suitable non-woven structure is a polyester felt impregnated with a polyurethane to hold the fibers together. Typical polyester felt rolls will have a thickness of 0.5 to 1.5 mm.

The polishing pad of the invention is suitable for polishing or planarizing at least one of semiconductor, optical and magnetic substrates with a polishing fluid and relative motion between the polishing pad and the at least one of semiconductor, optical and magnetic substrates. The polishing layer has an open-cell polymeric matrix. At least a portion of the open-cell structure opens up to a polishing surface. The large pores extend to the polishing surface having a vertical orientation. These large pores contained within a coagulated polymer matrix form the nap layer to a specific nap height. The height of the vertical pores is equal to the nap layer height. The vertical pore orientation forms during the coagulation process. For purposes of this patent application, vertical or the up and down direction is orthogonal to the polishing surface. The vertical pores have an average diameter that increases with distance from or below the polishing surface. The polishing layer typically has a thickness of 20 to 200 mils (0.5 to 5 mm) and preferably 30 to 80 mils (0.76 to 2.0 mm). The open-cell polymeric matrix having vertical pores and open channels interconnecting the vertical pores. Preferably, the open-cell polymeric matrix has interconnecting pores with sufficient diameter to allow transport of fluids. These interconnecting pores have an average diameter much smaller than the average diameter of the vertical pores. The pore morphology features open-top primary pores approximately 40 µm in size, and interconnected micropores of approximately 2 µm in size within the polyurethane layer.

A plurality of grooves in the polishing layer facilitates the distribution of slurry and the removal of polishing debris. Preferably, the plurality of grooves forms an orthogonal grid pattern. Typically, these grooves form an X-Y coordinate grid pattern in the polishing layer. The grooves have an average width measured adjacent a polishing surface. The plurality of grooves has a debris removal dwell time where a point on the at least one of semiconductor, optical and magnetic substrates rotated at a fixed rate passes over the width of the plurality of grooves. A plurality of projecting land areas within the plurality of grooves are advantageously buttressed with tapered support structures that extends outward and downward from the top of or the plane of the polishing surface of the plurality of projecting land areas. Preferably, at a slope of 30 to 60 degrees as measured from a plane of the polishing surface. Most preferably, the plurality of land areas has a frusta or non-pointed top that forms the polishing surface from the polymer matrix containing the vertical pores. Typically, the projecting land areas have a shape selected from hemispherical, frusta-pyramidal, frusta-trapezoidal and combinations thereof with the plurality of grooves extending between the projecting land areas in a linear manner. The plurality of grooves has an average depth greater than the average height of the vertical pores. In addition, the vertical pores have an average diameter that increases at least one depth below the polishing surface.

Melting and solidifying the thermoplastic polyurethane at the bottom of the sloped sidewalls closes the majority of the large and small pores and forms the groove channels. Preferably, the plastic deforming of sidewalls and the melting and solidifying steps form a grid of interconnecting grooves. The groove channels' bottom surface have few or no open pores. This facilitates the smooth removal of the debris and locks the poromeric polishing pad into its open-pore-tapered-pillow structure. Preferably, the grooves form a series of pillow structures formed from the porous matrix including the large pores and the small pores. Preferably, the small pores have a diameter sufficient to allow flow of deionized water between vertical pores.

A base layer is critical to forming a proper foundation. The base layer can be polymeric film or sheet. But woven or non-woven fibers provide the best substrates for poromeric polishing pads. For purposes of this specification, poromerics are breathable synthetic leathers formed from aqueous substitution of an organic solvent. Non-woven felts provide excellent substrates for most applications. Typically, these substrates represent polyester fibers, such as polyethylene terephthalate fibers or other polymer fibers formed by mixing, carding and needle punching.

For consistent properties, it is important that the felt has consistent thickness, density and compressibility. Forming felts from consistent fibers with consistent physical properties results in a base substrates having consistent compressibility. For additional consistency, it is possible to blend a shrinking fiber and a non-shrinking fiber, running the felt through a heated water bath to control the density of the felt. This has the advantage of using bath temperature and residence time to fine tune final felt density. After forming the felt, sending it through a polymer impregnation bath, such as an aqueous polyurethane solution coats the fibers. After coating the fibers, oven curing the felt adds stiffness and resilience.

Post-coating curing followed by a buffing step controls the felt thickness. For fine-tuning thickness, it is possible to first buff with a coarse grit, and then finish the felt with a fine grit. After buffing the felt, it is preferable to wash and dry the felt to remove any grit or debris picked up during the buffing step. Then after drying filing the backside with dimethylformamide (DMF) prepares the felt for a water proofing step. For example, perfluorocarboxylic acids and their precursors, such as AG-E092 repellant for textiles from AGC Chemicals can waterproof the top surface of the felt. After water proofing, the felt requires drying and then an optional burning step can remove any fiber ends that protrude through the felt's top layer. The waterproofed felt is then prepared for coating and coagulation.

A mixture of anionic and nonionic surfactants preferably forms pores during coagulation and contributes to improved hard segment-soft segment formation and optimum physical properties. For anionic surfactants, the surface-active portion of the molecule bears a negative charge. Examples of anionic surfactants include but are not limited to carboxylic acid salts, sulfonic acid salts, sulfuric acid ester salts, phosphoric and polyphosphoric acid esters and fluorinated anionics. More specific examples include but are not limited to dioctyl sodium sulfosuccinate, sodium alkylbenzene sulfonate and salts of polyoxyethylenated fatty alcohol carboxylates. For nonionic surfactants, the surface-active portion bears no apparent ionic charge. Examples of nonionic surfactants include but are not limited to polyoxyethylene (POE) alkylphenols, POE straight-chain alcohols, POE polyoxypropylene glycols, POE mercaptans, long-chain carboxylic acid esters, alkanolamine alkanolamides, tertiary acetylenic glycols, POE silicones, N-alkylpyrrolidones and alkylpolyglycosides. More specific examples include but are not limited tomonoglyceride of long-chain fatty acid, polyoxethylenated alkylphenol, polyoxyethylenated alcohol and polyoxyethylene cetyl-stearyl ether. See for example, "Surfactants and Interfacial Phenomena", by Milton J. Rosen, Third Edition, Wiley-Interscience, 2004, Chapter 1 for a more complete description of anionic and nonionic surfactants.

EXAMPLES

The following examples describe the invention with a focus on polyurethane formulation, coagulation control, and polishing performance.

Materials

In the Examples, Component A represents DIC's CRISVON™ 8166NC, methylenediphenyl diisocyanate (MDI) for producing "hard segments" in a thermoplastic polyurethane. In particular, the polyurethane was a polyester-type, low-modulus polyurethane processed in a coagulation process to form a top porous layer as polishing layer. Analytical specifications for Component A were as follows: non-volatile solid wt %: 29.0-31.0%; viscosity at 25° C.: 60,000-80,000 MPa(s); 300% modulus—17 MPa; tensile strength—55 MPa; elongation to fracture of at least 500% and a melting point of 195° C.

Chemical composition of Component A was determined by proton- and carbon13 NMR was as follows:

TABLE 2

| PU | Adipic acid ethylene glycol (mol %) | Adipic acid butane diol (mol %) | MDI-EG (mol %) | MDI (mol %) | Mn (g/mol) | Mw (g/mol) | PDI (Mn/Mw) | 100% modulus (MPa) | Contact Angle (degrees) |
|---|---|---|---|---|---|---|---|---|---|
| Component A | 46.8 | 26.0 | 11.2 | 15.9 | 71,530 | 153,900 | 2.2 | 6.0 | 64.0 |

MDI: Methylene diphenyl diisocyanate
MDI-EG: Methylene diphenyl diisocyanate ethylene glycol
Mn: Number-averaged molecular weight
Mw: Weight-averaged molecular weight
PDI: Polydispersity The first surfactant was RESAMINE CUT-30 Dioctyl sulfosuccinate sodium ("DSS") purchased from Dainichiseika. The second surfactant was PL-220 polyoxyethylene alkyl ether ("EOPO") purchased from Kao Chemical.

Component A: Polyurethane
Component B: Dioctyl sodium sulfosuccinate surfactant
Component C: Polyoxyalkylene alkyl ether surfactant
Component D: Dimethylformamide (DMF)

Formulations used various combinations of Components A to D formed in various coagulation processes:

TABLE 3

| Component | Category | Vendor | POR Concentration (phr) | Preferred range (phr) |
|---|---|---|---|---|
| A | Polyurethane | DIC Chemical | 100 | 100 |
| B | Surfactant | Dainichiseika Color & Chemicals | 4.0 | 0.5-5.0 |
| C | Surfactant | Kao Corporation | 1.0 | 0.5-4.0 |
| D | DMF Solvent | | | |

Note:
phr equals parts per hundred weight.

Control of pore growth and final pore morphology was achieved by using various concentrations of surfactant components B and C. The coating solution was a blend of components A, B, C, and D used in coating, followed by a water for DMF substitution coagulation process.

Coagulated films of the polyurethane formulations were made by lab drawdown tests to investigate surfactant ratios for creating the poromeric materials. Impregnated non-woven polyester felt was used as substrate. Polyurethane was diluted with DMF to the designed solid %, mixed with surfactants, degassed, and equilibrated to the designed temperature before drawing down. Coagulation was done in a DMF/water bath followed by washing and drying.

TABLE 4

| Procedures | | |
|---|---|---|
| Coating | Thickness | 65 mil/1.65 mm |
| | Solid % | 20% |
| PU blending | Temp. | 20° C. |
| Coagulation | Temp. | 30° C. |
| | DMF/water | 7 wt % |
| | Time | 7 min |
| Washing | Temp. | R.T. |
| | Time | 3 hr |
| Drying | Temp. | 120° C. |
| | Time | 1 hr |

Example 1

Polymer: Component A
Polymer concentration: 20 wt % in DMF
Surfactants: DSS and EOPO
Surfactant mixture concentrations:
DSS concentration=0.5, 1.0, 2.0, 3.0, 4.0 phr
EOPO concentration=0.5, 1.0, 2.0, 3.0, 4.0 phr
Coating thickness: 65 mil (1.65 mm)
DMF concentration: 7 wt %
Coagulation bath temperature: 30° C.
Sample size: 25 drawdowns Results:
DSS facilitates formation of primary pores.
EOPO assists formation of deep and cylindrical pores.
It was determined from this test that the best surfactant ratio to create the deepest primary pores was DSS/EOPO=4:1 phr/phr.

The two surfactants controlled the coagulation mechanisms and allowed primary pore growth. DSS surfactant facilitated the growth of primary pores deep to the bottom of the coated layer. The nap height of primary pores was deeper with increasing concentration of DSS surfactant.

Combination of DSS and EOPO surfactants regulated the coagulation of polyurethane, where primary pores of increased upper section cylindrical shape were formed instead of a pure tear-drop shape without a cylindrical section. EOPO surfactant with a concentration over 2.0 phr hindered primary pore growth and left only with a homogeneous layer of micropores. This was presumably due to EOPO's affinity towards the soft segments on the polyurethane chains, which facilitated solvating the polyurethane and decreasing the degree of phase separation.

The best ratio of DSS/EOPO surfactant was 4:1 phr/phr.

Example 2

Candidate Formulation: Component A
Polymer concentration: 20 wt %, 22 wt % in DMF
Surfactants: DSS and EOPO
Surfactant mixture concentrations:
DSS concentration=4.0 phr
EOPO concentration=1.0 phr
Coating thickness: 65 mil (1.65 mm), 90 mil (2.23 mm)
DMF concentration: 7 wt %
Coagulation bath temperature: 25° C., 30° C., 35° C.
Sample size: 12 drawdowns
Method: Lab drawdown test, standard conditions
Results:
Coagulation temperature affected pore morphology and nap growth.
Solid concentrations affected pore morphology, especially the tear-drop shape.
Pore growth could reach bottom of drawdowns with a thicker coating, but pore morphology required better control.

Example 3

Candidate Formulation: Component A
Polymer concentration: 20 wt % in DMF
Surfactants: DSS and EOPO
Surfactant mixture concentrations:
DSS concentration=4.0 phr
EOPO concentration=1.0 phr
Coating thickness: 65 mil (1.65 mm)
DMF concentration: 0 wt %, 7 wt %, 14 wt %
Coagulation bath temperature: 20° C., 30° C., 40° C.
Sample size: 9 drawdowns
Method: Lab drawdown test, standard conditions
Results:
Coagulation temperature had a significant impact on pore morphology and nap growth
Increasing the DMF concentration impeded primary pore formation.
Key process conditions in coagulation control and pore morphology were determined to be:
Coagulation bath temperature
Polymer solid %
DMF/water concentration
Coating thickness Example 4

Candidate Formulation: Component A
Polymer concentration: 20 wt % in DMF
Surfactants: DSS and EOPO
Surfactant mixture concentrations:
DSS concentration=3.2, 4.0, 4.8 phr
EOPO concentration=0.8, 1.0, 1.2 phr
Coating thickness: 65 mil (1.65 mm)
DMF concentration: 7 wt %
Coagulation bath temperature: 25° C.
Method: Lab drawdown test, standard conditions
Sample size: 11 drawdowns

TABLE 5

| (phr) | 3.2 DS | 4.0 DSS | 4.8 DSS |
|---|---|---|---|
| 0.8 EOPO | #2 | #3 | #4 |
| 1.0 EOPO | #6 | #1, #5, #8 | #7 |
| 1.2 EOPO | #9 | #10 | #11 |

Table 5 summarizes the surfactant ratios for Example 4. Table 6 provides the results for polishing pads produced with the conditions of Table 5. Data were summarized below based on SEM analysis.

TABLE 6

| Sample # | DSS (phr) | EOPO (phr) | Nap height (μm) | Pore diameter (μm) | Pore count (ea) | Pore area (%) |
|---|---|---|---|---|---|---|
| 1 | 4.0 | 1.0 | 516 | 55.9 | 77 | 28.6 |
| 2 | 3.2 | 0.8 | 502 | 49.4 | 69 | 25.9 |
| 3 | 4.0 | 0.8 | 430 | 39.5 | 127 | 29.2 |
| 4 | 4.8 | 0.8 | 390 | 62.2 | 63 | 29.7 |
| 5 | 4.0 | 1.0 | 487 | 50.2 | 92 | 29.4 |
| 6 | 3.2 | 1.0 | 400 | 47.1 | 100 | 28.7 |
| 7 | 4.8 | 1.0 | 472 | 47.3 | 84 | 27.5 |
| 8 | 4.0 | 1.0 | 594 | 39.4 | 146 | 28.2 |
| 9 | 3.2 | 1.2 | 426 | 38.2 | 156 | 28.5 |
| 10 | 4.0 | 1.2 | 491 | 43.3 | 117 | 29.7 |
| 11 | 4.8 | 1.2 | 370 | 44 | 100 | 27.9 |

Pore formation were observed to have a pore morphology within ±1.5 sigma variation. Surfactant ratios provided a significant impact on nap height comparing to other parameters. For the substrates of Table 6, pore structures of samples 1, 5 and 8 having a 4 to 1 DSS to EOPO concentration by weight percent provided the best pore morphologies.

Example 5 Film Tensile Property

TABLE 7

| # | Median Tensile Strength psi/MPa | Median Elongation % | Median Modulus psi/MPa | 25% Modulus psi/MPa | 50% Modulus psi/MPa | 100% Modulus psi/MPa | 300% Modulus psi/MPa | Energy to break in*lbf/cm *Kgf | Toughness psi/MPa |
|---|---|---|---|---|---|---|---|---|---|
| 1 | 8913/61 | 543 | 2539/18 | 613/4.2 | 845/5.8 | 1163/8.0 | 3090/21 | 56/114 | 18805/129 |

Formulation: CRISVON ™ 8166NC, CUT30/PL-220 = 4:1 phr

The above data illustrate excellent toughness and energy to break for the porous substrate. Note: The above properties represent films substrates tested in accordance with (ASTM D886).

Polishing Protocols

Pad polishing performance was determined on 300 mm blanket wafers installed on an Applied Materials Reflexion® LK 300 mm CMP polishing tool. The polishing removal rate experiments were performed on the copper wafers of 300 mm sheet 20K Cu electroplate from Novellus, TEOS wafers of 300 mm blanket 20 k tetraethylorthosilicate (TEOS) sheet wafers from Novellus, tantalum (Ta) wafers of 300 mm sheet 1K Tantalum from Sematech, Black Diamond™ and Coral™ low-k dielectric wafers of 300 mm sheet 5K BD (k=3.0) from CNSE, and BD2S wafers of 300 mm sheet 5K BD2 (k=2.7) from SVTC.

All polishing experiments were performed using ACuPLANE™ LK393c4 Cu barrier slurry from Rohm and Haas Electronic Materials CMP Inc. All wafers were polished with standard conditions of down pressure of 12.4 kPa (1.8 psi), a chemical mechanical polishing composition flow rate of 300 mL/min, a table rotation speed of 93 rpm and a carrier rotation speed of 87 rpm, typically for 60 seconds. A 3M-A82 diamond pad conditioner, commercially available from 3M, was used to dress the polishing pad. Table 8 listed the specs for 3M-A82 disks. The polishing pad was broken in with the conditioner using a down force of 2.0 lbs (0.9 kg) for 10 minutes at 73 rpm platen speed/111 rpm conditioner speed with high pressure wash (HPR) on. During polishing, the pad was conditioned with the conditioner fully ex-situ using a down force of 2.0 lbs (0.9 kg) for 3.2 seconds at 73 rpm platen speed and 111 rpm conditioner speed with high pressure wash (HPR) on.

TEOS removal rates were determined by measuring the film thickness before and after polishing using a KLA-Tencor SPECTRAFX200 metrology tool. Copper (Cu) and Tantalum (Ta) removal rates were determined using a KLA-Tencor RS100C metrology tool. Defect Map scanning was done with KLA-Tencor SP2 metrology tool, and defect review with KLA-Tencor eDR-5210 metrology tool.

TABLE 8

Specifications of conditioning disk 3M-A82.

| Disk | Diamond Size | Diamond shape | Form | Carrier | Cut rate range | Flatness (μm) |
|---|---|---|---|---|---|---|
| 3M-A82 | 74 μm | Blocky | Full | Stainless Steel | 6-14BL | <100 |

Polishing Examples

Four pad examples and their respective characterization are summarized below. All pads were manufactured from the same polyurethane/surfactant formulation with different process parameters of Sample 1.

TABLE 9

Coated Roll Characterization

|  | Comparative Example | Examples | | | |
|---|---|---|---|---|---|
|  | A | 1-1 | 1-2 | 1-3 | 1-4 |
| Formulation | DSS:EOPO = 0.5:2.0 | DSS:EOPO = 4.0:1.0 | DSS:EOPO = 4.0:1.0 | DSS:EOPO = 4.0:1.0 | DSS:EOPO = 4.0:1.0 |
| Polyurethane | PU Blend | Component A | Component A | Component A | Component A |
| PU Modulus (MPa) | 8.1 | 6.0 | 6.0 | 6.0 | 6.0 |
| Coagulation Temp (° C.) | 30° C. | 30° C. | 30° C. | 25° C. | 25° C. |
| Line Speed (m/min) | 4.2 | 4.2 | 4.2 | 3.5 | 4.7 |
| Substrate | Felt | Felt | Felt | Felt | Felt |
| Thickness (mm) | 1.15 | 1.18 | 1.22 | 1.18 | 1.17 |
| Nap Height (μm) | 485 | 348 | 402 | 492 | 501 |
| Compressibility (%) | 3.8 | 4.2 | 4.3 | 4.9 | 6.9 |
| Asker-C | 57 | 54 | 54 | 55 | 52 |
| Density (g/cm3) | 0.34 | 0.37 | 0.36 | 0.38 | 0.33 |
| Pore size/Ave. (μm) | 42 | 45 | 44 | 44 | 47 |
| Pore count (ea/mm$^2$) | 173 | 148 | 159 | 189 | 145 |
| Pore Area (%) | 26 | 25 | 26 | 30 | 28 |
| Roughness $R_a$ (μm) | 7 | 7 | 8 | 6 | 7 |
| Roughness $R_p$ (μm) | 21 | 21 | 23 | 19 | 19 |

Felt = Non-woven Felt

Figure 5:
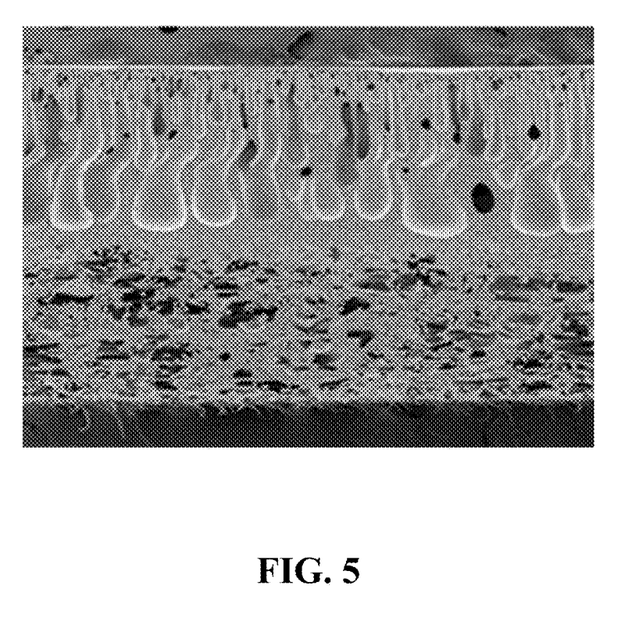
FIG. 5 is an SEM photo of a cross section taken parallel to the roll direction.

The above pads all had the pore structure of FIGS. 3A, 4 and 5. In particular, the primary pores had a spring-arm shape that facilitated pad compressibility. The above data show that increasing line speed increased the compressibility of the polishing pad. The increased compressibility increases contact area during polishing. This increased contact area allowed the pads to operate with a softer structure that is less prone to generating defects.

Example 6 Polishing Performance

Removal rates and defectivity results are summarized in tables below.

Example 7: Polishing Performance of Pad 1, 4 Different Batches

TABLE 10

|  | Reference Pads | | Examples | | | |
|---|---|---|---|---|---|---|
| Pad | B | A | 1-4A | 1-4B | 1-4C | 1-4D |
| Cu RR (Å/min) | 718 | 787 | 694 | 680 | 758 | 730 |
| TEOS RR (Å/min) | 1422 | 1397 | 1416 | 1414 | 1443 | 1336 |
| Ta RR (Å/min) | — | — | — | — | 593 | — |
| Low-k (Å/min) | — | — | — | — | 793 | — |
| Scratches and Chattermarks* (ea) | 736 | 126 | 5 | 9 | 1 | 10 |

*Scratches and chattermarks determined with enhanced scanning recipe on SP2

TABLE 11

Marathon Removal Rate (Å/Min.)

| Wafer Count | 25 | 50 | 100 | 150 | 200 | 250 | 300 | 350 | 400 | 450 | 500 | Avg. | Range |
|---|---|---|---|---|---|---|---|---|---|---|---|---|---|
| Cu | 693 | 713 | 712 | 718 | 708 | 717 | 707 | 767 | 738 | 776 | 736 | 726 | 83 |
| TEOS | 1308 | 1324 | 1341 | 1342 | 1347 | 1356 | 1357 | 1343 | 1343 | 1384 | 1361 | 1347 | 76 |
| Ta | 500 | | | | 505 | | | | 503 | | 509 | 504 | 9 |

The above Table shows excellent polishing stability for five-hundred wafers when polishing copper, TEOS and tantalum substrates.

Example 7 Removal Rate

TABLE 12

Copper Removal Rate

| Pad Sample | Pad Quantity | Mean Removal Rate (Å/Min.) | Std. Dev. |
|---|---|---|---|
| A | 3 | 787 | 9 |
| B | 3 | 718 | 26 |
| 1-4A | 3 | 694 | 10 |
| 1-4B | 3 | 680 | 3 |

TABLE 13

TEOS Removal Rate

| Pad Sample | Pad Quantity | Mean Removal Rate (Å/Min.) | Std. Dev. |
|---|---|---|---|
| A | 3 | 1397 | 9 |
| B | 3 | 1422 | 6 |
| 1-4A | 3 | 1416 | 14 |
| 1-4B | 3 | 1415 | 25 |

For copper removal rate, examples 1-4A and 1-4B pads exhibited copper rate at 694 and 680 Å/min, respectively, roughly 12% and 14% lower than commercial pad A. TEOS removal rate of 1-4A and 1-4B was at 1416 and 1414 Å/min, similar to commercial pads A and B. The similar removal rates between commercial pads A, pad B, and examples 1-4A and 1-4B pads suggest that good contact area or abrasion and affinity between pad, abrasive, and wafer facilitate effective oxide and copper removal.

Example 8 Defectivity Performance

TABLE 14

SP2 Defects

| Pad Sample | Pad Quantity | Defect Count | Std. Dev. |
|---|---|---|---|
| A | 3 | 73 | 98 |
| B | 3 | 146 | 136 |
| 1-4A | 3 | 19 | 22 |
| 1-4B | 3 | 37 | 49 |

TABLE 15

SP2 Defects Enhanced Recipe

| Pad Sample | Pad Quantity | Defect Count | Std. Dev. |
|---|---|---|---|
| A | 3 | 241 | 217 |
| B | 3 | 736 | 131 |
| 1-4A | 3 | 34 | 41 |
| 1-4B | 3 | 85 | 106 |

TABLE 16

SP2 Chatter Marks

| Pad Sample | Pad Quantity | Chatter Marks | Std. Dev. |
|---|---|---|---|
| A | 3 | 10 | 4 |
| B | 3 | 35 | 27 |
| 1-4A | 3 | 4 | 3 |
| 1-4B | 3 | 1 | 1 |

TABLE 17

SP2 Chatter Marks Enhanced Recipe

| Pad Sample | Pad Quantity | Chatter Marks | Std. Dev. |
|---|---|---|---|
| A | 3 | 126 | 51 |
| B | 3 | 360 | 223 |
| 1-4A | 3 | 5 | 5 |
| 1-4B | 3 | 9 | 2 |

Polishing pads 1-4A and 1-4B exhibited much lower total defect count than commercial pads A and B. The total defect count averaged 73, 146, 19, 37 counts, and scratches and chattermarks averaged 35, 10, 4, and 1 count for pads A, B, 1-4A and 1-4B, respectively. This illustrated a measurable and dramatic decrease in polishing defects. The high compressibility pads produced with the highest line speed tended to have the lowest defect totals.

An enhanced scanning recipe was created to enhance resolution and differentiate performances. The results are summarized in graphs on the right, showing total defect counts of 241, 736, 34, 85, and scratches and chattermarks of 126, 360, 5, 9 counts for pads A, B, 1-4A and 1-4B, respectively. Polishing pads 1-4A and 1-4B showed an average over >99% reduction in scratches and chattermarks comparing to commercial pad B, and >95% reduction comparing to commercial pad A. The high compressibility pads produced with the highest line speed tended to have the lowest chattermark defects.

Example 9 Post-polished pad analysis

SEM analysis was done on post-polished pad surface to evaluate pad wear. Sampling areas included pad center, middle, and edge. For polishing pads 1-4A and 1-4B, all primary pores remained opened and clear of debris. No significant hanging materials were seen from either pad break-in, conditioning, or wafer polishing. In addition, there was no significant differences in surface pore morphology from pad center, middle, or edge. This suggested that consistent wear occurred over the entire pad. Furthermore, higher resolution SEM images (500× and 1000× magnification) showed clear secondary pore structures. The smaller micropores remained opened post-polish, and no debris accumulation was observed. This indicated effective slurry flow through the porous structure. No differences were seen between pad center, middle, or edge.

The uniform distribution of primary pores and interconnected micropores represent a reason for the pads excellent performances providing a satisfactory removal rate and in combination with excellent defectivity performance. This invention demonstrated new high compressibility structure provided excellent polishing performance. In particular, it demonstrated ultra-low defectivity, good removal rates on copper, TEOS, barrier metals, and long pad life. In particular, the pad polishes with excellent copper and TEOS rates that remain stable for multiple wafers. Furthermore, the pads have significantly lower scratch and chattermark defects than conventional polishing pads. The usage of manufacturing process was determinant of the final primary and secondary pore structures. Furthermore, the manufacturing process was robust; and it delivered reproducible pad pore morphology and polishing performances.

We claim:

1. A method of forming a porous polyurethane polishing pad comprising:
feeding liquid polyurethane onto a web sheet with a doctor blade while back tensioning the web with compression into the web sheet to prevent the liquid polyurethane from leaking opposite of a web direction;
coagulating liquid polyurethane onto the web sheet to form a two-layer substrate, the two-layer substrate being a porous body on the web sheet, the porous body having a porous matrix, wherein the porous matrix has large pores extending upward from a base surface and open to an upper surface, the large pores being interconnected with tertiary pores, a portion of the large pores being open to a top polishing surface;
pulling the two layer substrate over a touch roll to compress the porous body and pull the porous body forming to deform the porous matrix in a shear zone, after passing the shear zone, at least a portion of the large pores extending to the top polishing surface have a lower and upper sections with a vertical orientation, vertical direction being a direction orthogonal to the web sheet and spring-arm sections connecting the lower and upper sections, the spring-arm sections all being in the web direction and having an angle from an upward vertical between 15 and 90 degrees wherein the spring-arm sections combine to increase compressibility and contact area of the polishing pad;
curing the two layer substrate to cure the porous body and lock the porous body with the spring-arm-sections connecting the lower and upper sections; and
forming the cured porous body into the polishing pad, the polishing pad containing the spring-arm-sections connecting the lower and upper sections.

2. The method of claim 1 including the additional steps of buffing the porous body to increase size of large pores open at a polishing surface of the polishing pad and embossing the porous body to create a groove pattern.

3. The method of claim 2 wherein the shear zone elongates the large pores in a non-vertical direction to decrease a diameter of the spring-arm sections.

4. The method of claim 2 wherein the shear zone forms the spring-arm sections having an angle between 25 and 80 degrees as measured from an upward vertical direction.

5. The method of claim 1 wherein the back blade pushes the web against a rotating roll to apply back tension with the web and a knife blade regulates thickness of the porous body without applying significant back tensioning of the porous body.

6. A method of forming a porous polyurethane polishing pad comprising:
feeding liquid polyurethane onto a web sheet with a doctor blade while back tensioning the web with compression into the web sheet to prevent the liquid polyurethane from leaking opposite of a web direction;
coagulating liquid polyurethane onto the web sheet to form a two-layer substrate, the two-layer substrate being a porous body on the web sheet, the porous body having a porous matrix, wherein the porous matrix has large pores extending upward from a base surface and open to an upper surface, the large pores being interconnected with tertiary pores, a portion of the large pores being open to a top polishing surface;
pulling the two layer substrate over a touch roll to compress the porous body and pull the porous body forming to deform the porous matrix in a shear zone, after passing the shear zone, at least a portion of the large pores extending to the top polishing surface have a lower and upper sections with a vertical orientation, vertical direction being a direction orthogonal to the web sheet and spring-arm sections connecting the lower and upper sections, the spring-arm sections all being in the web direction and having an angle from an upward vertical between 15 and 90 degrees wherein the spring-arm sections combine to increase compressibility and contact area of the polishing pad;
forming middle-sized pores having a vertical orientation adjacent the spring-arm sections of the large pores and small pores between the middle-sized pores;
curing the two layer substrate to cure the porous body and lock the porous body with the spring-arm-sections connecting the lower and upper sections; and
forming the cured porous body into the polishing pad, the polishing pad containing the spring-arm-sections connecting the lower and upper sections.

7. The method of claim 6 including the additional steps of buffing the porous body to increase size of large pores open at a polishing surface of the polishing pad and embossing the porous body to create a groove pattern.

8. The method of claim 7 wherein the shear zone elongates the large pores in a non-vertical direction to decrease a diameter of the spring-arm sections.

9. The method of claim 7 wherein the shear zone forms the spring-arm sections having an angle between 25 and 80 degrees as measured from an upward vertical direction.

10. The method of claim 6 wherein the back blade pushes the web against a rotating roll to apply back tension with the web and a knife blade regulates thickness of the porous body without applying significant back tensioning of the porous body.

* * * * *